US007250613B2

United States Patent
Fuchs et al.

(10) Patent No.: US 7,250,613 B2
(45) Date of Patent: Jul. 31, 2007

(54) DEVICE FOR DETECTING IONIZING RADIATION USING A LAYER OF FLUORESCENT MATERIAL

(75) Inventors: Manfred Fuchs, Nürnberg (DE); Erich Hell, Giengen (DE); Peter Hackenschmied, Nürnberg (DE); Wolfgang Knuepfer, Erlangen (DE)

(73) Assignee: Agfa-Gevaert, Mortsel (BE)

( * ) Notice: Subject to any disclaimer, the term of this patent is extended or adjusted under 35 U.S.C. 154(b) by 59 days.

(21) Appl. No.: 10/432,968

(22) PCT Filed: Sep. 27, 2001

(86) PCT No.: PCT/DE01/03708

§ 371 (c)(1),
(2), (4) Date: Mar. 8, 2004

(87) PCT Pub. No.: WO02/27353

PCT Pub. Date: Apr. 4, 2002

(65) Prior Publication Data

US 2004/0169148 A1 Sep. 2, 2004

(30) Foreign Application Priority Data

Sep. 27, 2000  (DE) ................. 100 47 916

(51) Int. Cl.
  *G01T 1/00*  (2006.01)
  *C09K 11/02* (2006.01)
(52) U.S. Cl. ............. 250/483.1; 252/301.4 R

(58) Field of Classification Search ............ 250/483.1, 250/486.1, 482.1, 337, 484.3, 487.1, 484.4, 250/182.14, 301.4 R
See application file for complete search history.

(56) References Cited

U.S. PATENT DOCUMENTS

| | | | | |
|---|---|---|---|---|
| 4,104,523 A | * | 8/1978 | Wolfert | 250/370.02 |
| 4,362,946 A | * | 12/1982 | Cusano et al. | 250/483.1 |
| 4,562,158 A | * | 12/1985 | Schellenberg | 436/57 |
| 4,749,856 A | * | 6/1988 | Walker et al. | 250/227.11 |
| 5,023,461 A | * | 6/1991 | Nakazawa et al. | 250/484.4 |
| 5,083,031 A | * | 1/1992 | Hoelsher et al. | 250/484.3 |
| 5,132,539 A | * | 7/1992 | Kwasnick et al. | 250/361 R |
| 5,401,971 A | * | 3/1995 | Roberts | 250/484.4 |
| 6,362,484 B1 | * | 3/2002 | Beyne et al. | 250/374 |
| 6,476,406 B1 | * | 11/2002 | Struye et al. | 250/585 |
| 6,494,082 B1 | * | 12/2002 | Mizobe | 73/40 |
| 2002/0166977 A1 | * | 11/2002 | Kohda et al. | 250/484.4 |

FOREIGN PATENT DOCUMENTS

JP  02275436 A  *  11/1990

\* cited by examiner

*Primary Examiner*—David Porta
*Assistant Examiner*—Faye Boosalis
(74) *Attorney, Agent, or Firm*—Joseph T. Guy; Nexsen Pruet, LLC

(57) ABSTRACT

The invention relates to a device for capturing ionizing radiation, in which a substrate which is provided with a phosphor layer is accommodated in a housing. To simplify the device and to ensure a high light yield, the invention provides that a means for buffering the atmospheric humidity is accommodated in the housing.

13 Claims, 1 Drawing Sheet

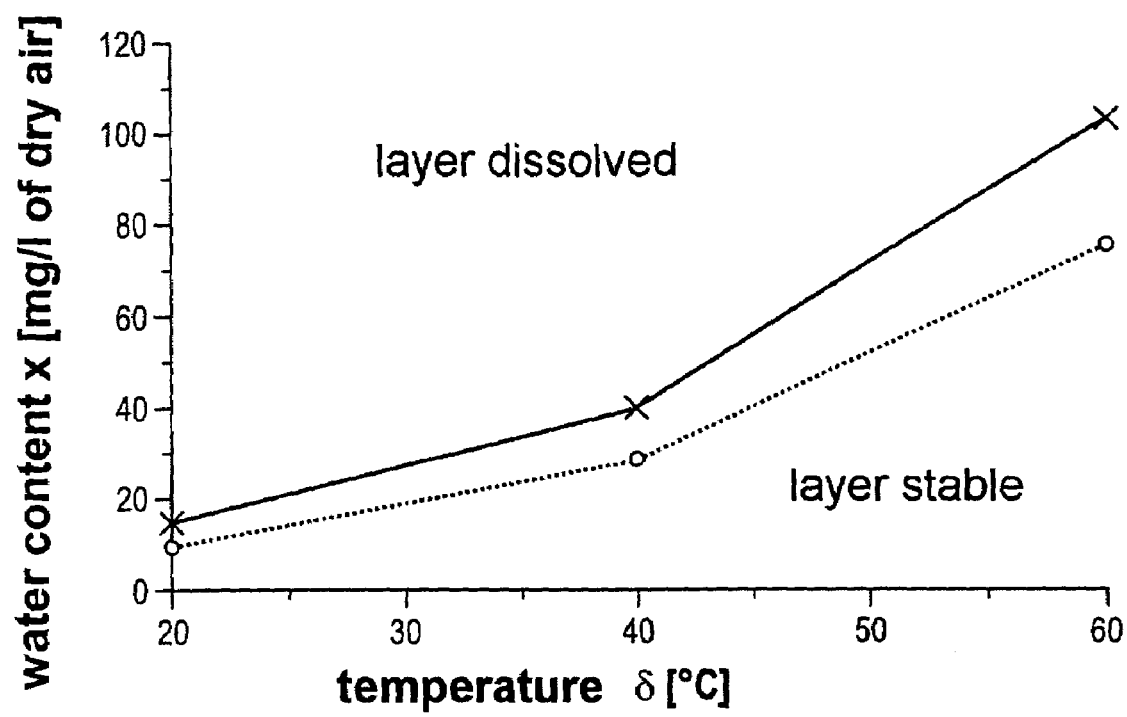

DEVICE FOR DETECTING IONIZING RADIATION USING A LAYER OF FLUORESCENT MATERIAL

FIELD OF THE INVENTION

The invention relates to a device for capturing ionizing radiation.

BACKGROUND OF THE INVENTION

Particularly in the case of X-ray luminescent screens, the phosphors used are alkali metal halides, e.g. CsI, CsBr, NaI, RbBr and the like. Alkali metal halides are water-soluble and hygroscopic. They absorb and chemisorb moisture from the air. This undesirably leads to a reduction in the light yield and to decomposition of the phosphor layer.

To counteract this problem, there has been a tendency, according to the prior art, to protect the phosphor layer by means of a moisture-tight cover. In this context, reference is made, for example, to DE 42 22 946 C2, EP 0 932 053 A1 or EP 0 903 590 A1.

It is also known, in order to eliminate the above problem, to enclose the substrate which incorporates the phosphor layer in a housing under a vacuum. A housing of this type is expensive to produce. Over the course of time, the vacuum may be lost. For certain phosphor compositions, for example highly Eu-doped CsBr, discoloration which reduces the light yield occurs in vacuum.

BRIEF SUMMARY OF THE INVENTION

It is an object of the invention to eliminate the drawbacks in accordance with the prior art. It is intended in particular to provide a device for capturing ionizing radiation which can be produced easily and at low cost and the light yield of which is as high as possible.

This object is achieved by the features of claim 1. Expedient configurations result from the features of claims 2 to 9.

According to the invention, it is provided that the housing accommodates a means for buffering the atmospheric humidity.

BRIEF DESCRIPTION OF THE DRAWING

The FIGURE shows the temperature and water content in the air at which a CsBr phosphor layer is stable.

DETAILED DESCRIPTION OF THE INVENTION

Surprisingly, it has been found that this simple measure is sufficient to counteract the disadvantageous effects of the atmospheric humidity on phosphors. A humidity-buffered housing of this type is suitable in particular for accommodating phosphors which tend to be discolored under a vacuum or under excessively dry air. The proposed device is simple and inexpensive to produce.

The phosphor layer is expediently formed from a doped alkali metal halide. This may be CsBr:Eu. The device according to the invention makes it possible to use highly Eu-doped CsBr. The yellow discoloration of this phosphor which can be observed in vacuum or when the atmospheric humidity is too low does not occur in this device.

The housing may substantially be produced from a water-vapor-impermeable material, preferably from glass, metal or plastic. It is not absolutely imperative for the housing to be sealed against the penetration of atmospheric humidity.

The drying buffer may contain a saturated solution of a further alkali metal halide. It has proven particularly effective to use alkali metal chlorides. However, it is also possible for the alkali metal halide of the phosphor layer and the further alkali metal halide of the drying buffer to have the same composition. In this case, there is no possibility of the phosphor being contaminated.

Moreover, the drying buffer may contain silica gel. Silica gel, unlike the further halide, serves to take up moisture from the air. As an alternative to silica gel, it is also possible to use other drying agents with a similar action.

A fresh-air access provided on the housing is expediently designed in such a way that fresh air which enters the housing is passed via the drying buffer. This ensures at all times that the atmospheric humidity in the housing is kept within the predetermined atmospheric humidity range. The drying buffer is expediently used to set a constant atmospheric humidity in the range from 50 to 60%, preferably of 55%, in the housing.

An exemplary embodiment is explained in more detail below with reference to the drawing, in which the only FIGURE shows the layer stability of a CsBr phosphor layer as a function of the ambient temperature.

The FIGURE shows the temperature and water content in the air at which a CsBr phosphor layer is stable. The limit of the stability range is shown by the solid line.

The dashed line shows the water content in the air as a function of the temperature in a housing in which a drying buffer is accommodated. It can be seen that the action of the drying buffer always keeps the water content in the air within a range in which the phosphor layer is not dissolved.

The drying buffer used here was a saturated LiCl solution in combination with silica gel. Other suitable drying buffers are commercially available drying buffers for conditioning the air in display cabinets for works of art.

A suitable drying buffer of this type is marketed, for example, under the trade name "Art Sorb".

When using the drying buffer, it is possible in particular to use CsBr phosphor layers which are highly doped with, for example, Eu. The yellow discoloration of this phosphor which occurs if the atmospheric humidity is too low or too high is not observed when it is accommodated in a drying-buffered housing. A device of this type is simple and inexpensive to produce. It has a particularly high light yield.

The invention claimed is:

1. A device for capturing ionizing radiation, in which a substrate which is provided with a phosphor layer formed from CsBr:Eu as a doped alkali metal halide is accommodated in a housing, wherein a means for buffering the atmospheric humidity is accommodated in the housing and in which the housing is substantially produced from glass or plastic as a water-vapor-impermeable material wherein said means for buffering the atmospheric humidity contains a saturated solution of a further alkali metal halide.

2. The device of claim 1 wherein the alkali metal halide and the further alkali metal halide have the same composition.

3. The device of claim 2 wherein said means for buffering the atmospheric humidity contains silica gel.

4. The device of claim 3 wherein a fresh-air access provided on the housing is designed in such a way that fresh air which enters the housing is passed via said means for buffering the atmospheric humidity, wherein said means is used to set a constant atmospheric humidity in the range from 50 to 60% in the housing.

5. The device of claim 2 wherein a fresh-air access provided on the housing is designed in such a way that fresh air which enters the housing is passed via said means for buffering the atmospheric humidity, wherein said means is used to set a constant atmospheric humidity in the range from 50 to 60% in the housing.

6. The device of claim 1 wherein said means for buffering the atmospheric humidity contains silica gel.

7. The device of claim 6 wherein a fresh-air access provided on the housing is designed in such a way that fresh air which enters the housing is passed via said means for buffering the atmospheric humidity, wherein said means is used to set a constant atmospheric humidity in the range from 50 to 60% in the housing.

8. The device of claim 1 wherein a fresh-air access provided on the housing is designed in such a way that fresh air which enters the housing is passed via said means for buffering the atmospheric humidity, wherein said means is used to set a constant atmospheric humidity in the range from 50 to 60%, in the housing.

9. The device of claim 1 wherein said means for buffering the atmospheric humidity contains a saturated solution of alkali metal chlorides.

10. The device of claim 9 wherein said means for buffering the atmospheric humidity contains silica gel.

11. The device of claim 10 wherein a fresh-air access provided on the housing is designed in such a way that fresh air which enters the housing is passed via said means for buffering the atmospheric humidity, wherein said means is used to set a constant atmospheric humidity in the range from 50 to 60% in the housing.

12. The device of claim 9 wherein a fresh-air access provided on the housing is designed in such a way that fresh air which enters the housing is passed via said means for buffering the atmospheric humidity, wherein said means is used to set a constant atmospheric humidity in the range from 50 to 60% in the housing.

13. A device for capturing ionizing radiation, in which a substrate which is provided with a phosphor layer formed from CsBr:Eu as a doped alkali metal halide is accommodated in a housing, wherein a means for buffering the atmospheric humidity is accommodated in the housing and in which the housing is substantially produced from glass or plastic as a water-vapor-impermeable material wherein a fresh-air access provided on the housing is designed in such a way that fresh air which enters the housing is passed via said means for buffering the atmospheric humidity, wherein said means is used to set a constant atmospheric humidity in the range from 50 to 60% in the housing.

* * * * *